United States Patent [19]
Warrick et al.

[11] Patent Number: 5,730,492
[45] Date of Patent: Mar. 24, 1998

[54] LOAD-LIMITING SEAT

[75] Inventors: James C. Warrick, Tempe, Ariz.; James Yuhas, Carlsbad, Calif.; Ken-An Lou, Phoenix; Gershon Yaniv, Scottsdale, both of Ariz.

[73] Assignee: Simula Inc., Phoenix, Ariz.

[21] Appl. No.: 598,927

[22] Filed: Feb. 9, 1996

[51] Int. Cl.[6] ..................................... B60N 2/42
[52] U.S. Cl. ...................... 297/216.2; 297/326
[58] Field of Search .............. 297/216.1, 216.16, 297/216.19, 216.2, 232, 325, 326, 331, 335, 248; 248/501, 502, 503.1, 188.1, 188.8; 244/122 R, 118.5, 118.6

[56] References Cited

U.S. PATENT DOCUMENTS

| | | | |
|---|---|---|---|
| 2,933,127 | 4/1960 | Brewster | 297/216.2 |
| 2,959,207 | 11/1960 | Brewster | |
| 3,059,966 | 10/1962 | Spielman | |
| 3,603,638 | 9/1971 | McGregor | 297/216.2 |
| 4,440,441 | 4/1984 | Marrujo et al. | 297/216.2 |
| 4,523,730 | 6/1985 | Martin | |
| 4,718,719 | 1/1988 | Brennan | |
| 4,796,837 | 1/1989 | Dowd | 248/503.1 X |
| 4,861,103 | 8/1989 | Vallee | 297/216.2 |
| 4,911,381 | 3/1990 | Cannon et al. | |
| 5,058,829 | 10/1991 | Bentley | |
| 5,069,505 | 12/1991 | Amthor et al. | 297/216.2 |
| 5,152,578 | 10/1992 | Kiguchi | 297/216.16 |
| 5,227,979 | 7/1993 | Bales et al. | 244/122 R X |

*Primary Examiner*—Milton Nelson, Jr.
*Attorney, Agent, or Firm*—Crowell & Moring LLP

[57] ABSTRACT

A leg assembly for mounting passenger seats in transport vehicles especially configured to absorb energy, in the event of a survivable crash or other sudden deceleration. The seat legs deform in a controlled manner to prevent loads at its floor attachment points from exceeding the magnitude of allowable floor strength. The leg assembly includes a base member whose forward and rear ends attach to the floor, and a V-leg whose lower vertex pivots about an axis passing through the front of the base member in the event of a forward crash. The V-leg has a vertical member and a diagonal member. A load-limiting strut connects the rear end of the base member to an intermediate area on the diagonal member of the V-leg. A tension link connects the intermediate area of the V-leg and to the upper end of the vertical member of the V-leg. Elongation of the load-limiting strut allows the seat and legs to pitch forward at a predetermined inertial loading which, if exceeded substantially, would rip the seat loose from the floor. The tension link elongates at a predetermined load to distribute the loads within the seat.

51 Claims, 10 Drawing Sheets

LOAD-LIMITING SEAT

BACKGROUND

1. Field of the Invention

The present invention relates to passenger seats in passenger transport vehicles such as aircraft, and more particularly to an energy-absorbing leg assembly for such seats that limits floor reactions from a 16 g dynamic forward load to magnitudes that can be sustained by floors designed to withstand no more than a 9 g static forward load.

2. Background of the Invention

The ability of passenger seats to withstand the sudden deceleration resulting from a crash is an important aspect of passenger survivability in crashes of aircraft or other passenger vehicles. However, simply strengthening the seat assemblies does not improve survivability, because heavier and stronger assemblies do not prevent the passenger seats from breaking away from floor mountings.

In most cases, seat assemblies are attached to the floor of, e.g., aircraft, using attachment fittings that are mounted in longitudinal tracks in the floor of the aircraft. The longitudinal tracks extend the length of the aircraft cabin. The cross-section of the tracks is an inverted T-slot. At one-inch increments, the track is enlarged to a circular hole. Installation of seats is performed by inserting the heads of mushroom-shaped studs protruding downward from each leg of the seat assembly into the circular holes in the floor track, then sliding the seat one-half inch forward or backward to engage the stud in the track.

Next, shear pins are lowered from the seat into one of the track holes to lock the seat in place and prevent it from sliding forward or backward. As is known to one skilled in the art, the shear pins have many shapes and have been held down by many methods. Sometimes a visual indication of the unlock position of the shear pin is provided. Typically, each leg has one stud at its front and two studs at its rear. Also, airline operators require anti-rattle mechanisms that preload the studs upward against the underside of the track lips.

To overcome the problem of seats breaking away from floor mountings, seats have been manufactured to provide energy absorption in theft leg structures through deformation of the legs. In certain prior art seat assemblies, opposition to forward movement of the seat increases as the seat moves forward, a characteristic of elastic deformation. This is not as effective in absorbing energy as a system which opposes forward movement at a maximum almost instantaneously and remains at that level throughout the seat travel, which is a characteristic of plastic deformation. This has been accomplished on some seat assemblies by utilizing an energy absorbing strut which is a die and drawtube arrangement. These prior art leg assemblies, disclosed in U.S. Pat. Nos. 3,059,966 to Spielman and 4,523,730 to Martin, as well as the leg assemblies disclosed in U.S. Pat. Nos. 4,718,719 to Brennan, and 5,152,578 to Kiguchi, do not return to theft pre-crash configuration, thus leaving the seat in a position to impede passenger egress.

U.S. Pat. No. 4,911,381 to Cannon et al., which is incorporated herein by reference, discloses an energy-absorbing leg assembly for aircraft passenger seats comprising a load-limiting energy-absorbing member mounted between the bottom of the pivoting rear leg at the apex of an A-frame truss base member and the top of the pivoting front leg. If a crash occurs, the energy-absorbing member is extended under tension, reducing the inertial forces which would otherwise be exerted on the seat's occupant, and reducing the possibility that the seat may be torn away from the floor of the aircraft.

Many prior art seat assemblies built before 1988 are capable of withstanding forward and backward and up and down loads but have been found to fail when subjected to sideward loading and sometimes to fail catastrophically when subjected to floor warpage. In June 1988, the FAA specifications began requiring accommodation of floor warpage defined as a 10° roll of one track and a 10° pitch of the other, imposed prior to the dynamic forward acceleration test. Prior art floor attachment fittings, including those built after June 1988, have poor energy management components that do not selectively and accurately attenuate the vertical uploads applied to the floor by the rear attachment points of the seat. To achieve the maximum safety when seats in older aircraft are replaced, the new seats should avoid overstressing the floors of those aircraft during crashes.

SUMMARY OF THE INVENTION

The present invention is an aircraft seat designed to deform in a controlled manner to prevent loads at its floor attachment points from exceeding the magnitude of the allowable floor strength. It provides the maximum safety when seats in older aircraft are replaced. The new seats avoid overstressing the floors of those aircraft during crashes.

Figure 1:
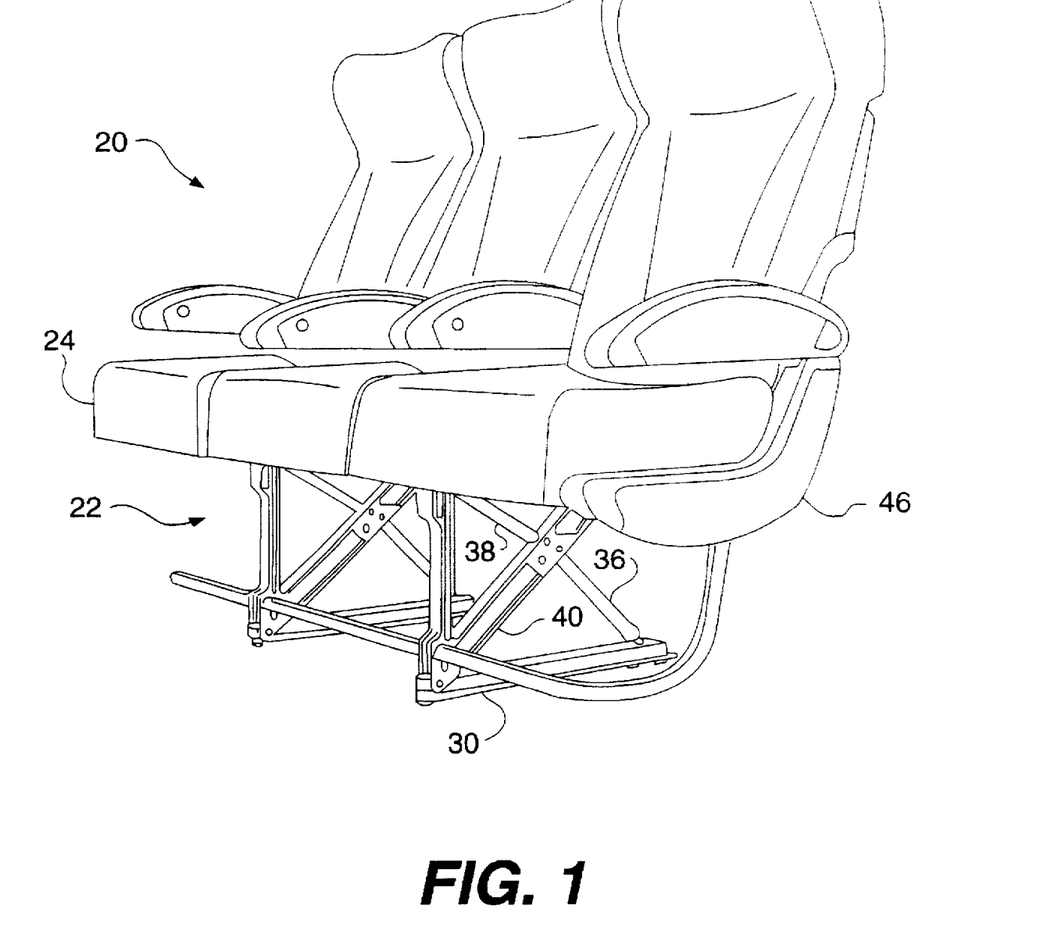
FIG. 1 is a schematic diagram of a perspective view of a complete seat assembly.
Figure 2:
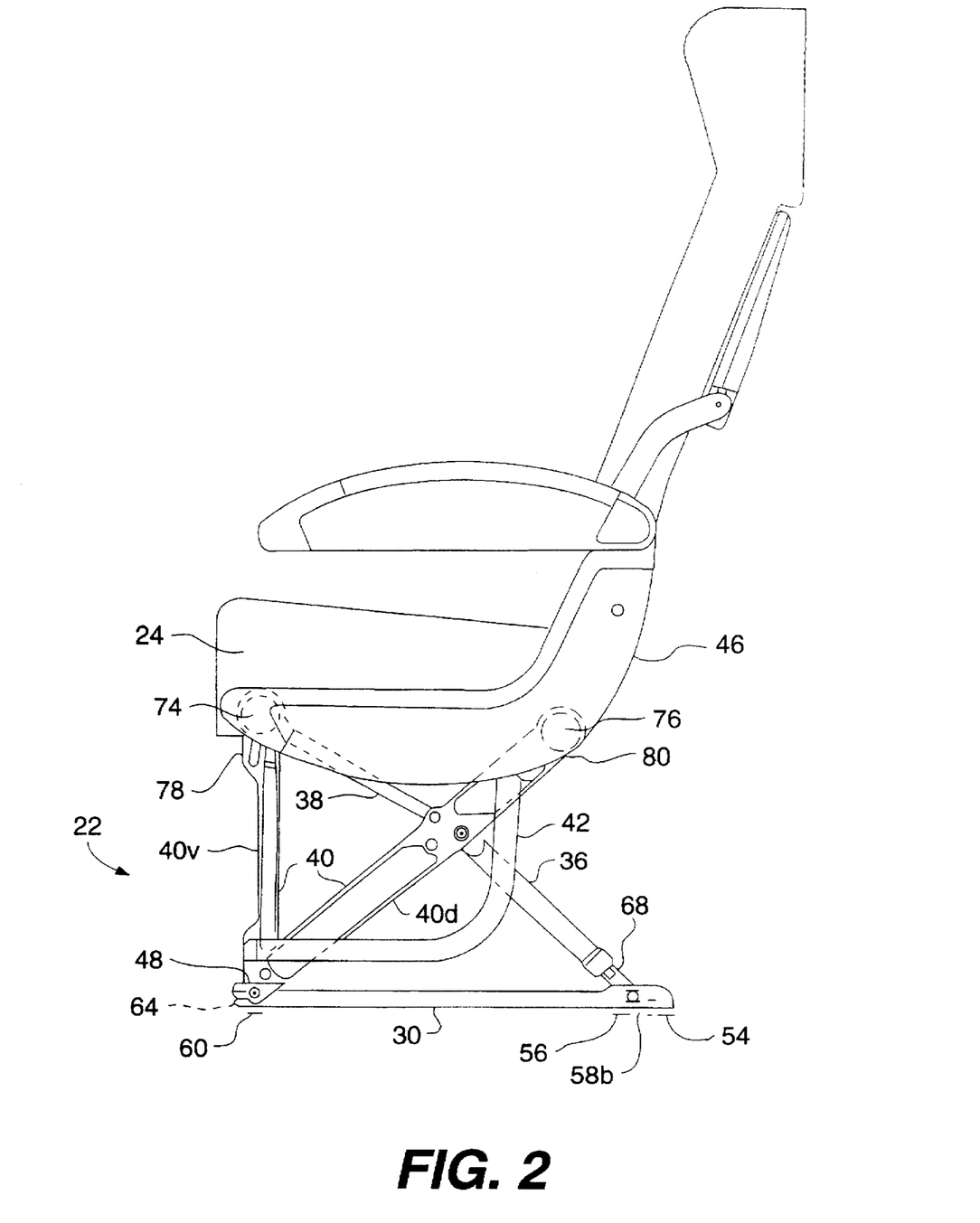
FIG. 2 is a schematic diagram of a side view of the seat prior to a crash.
Figure 3:
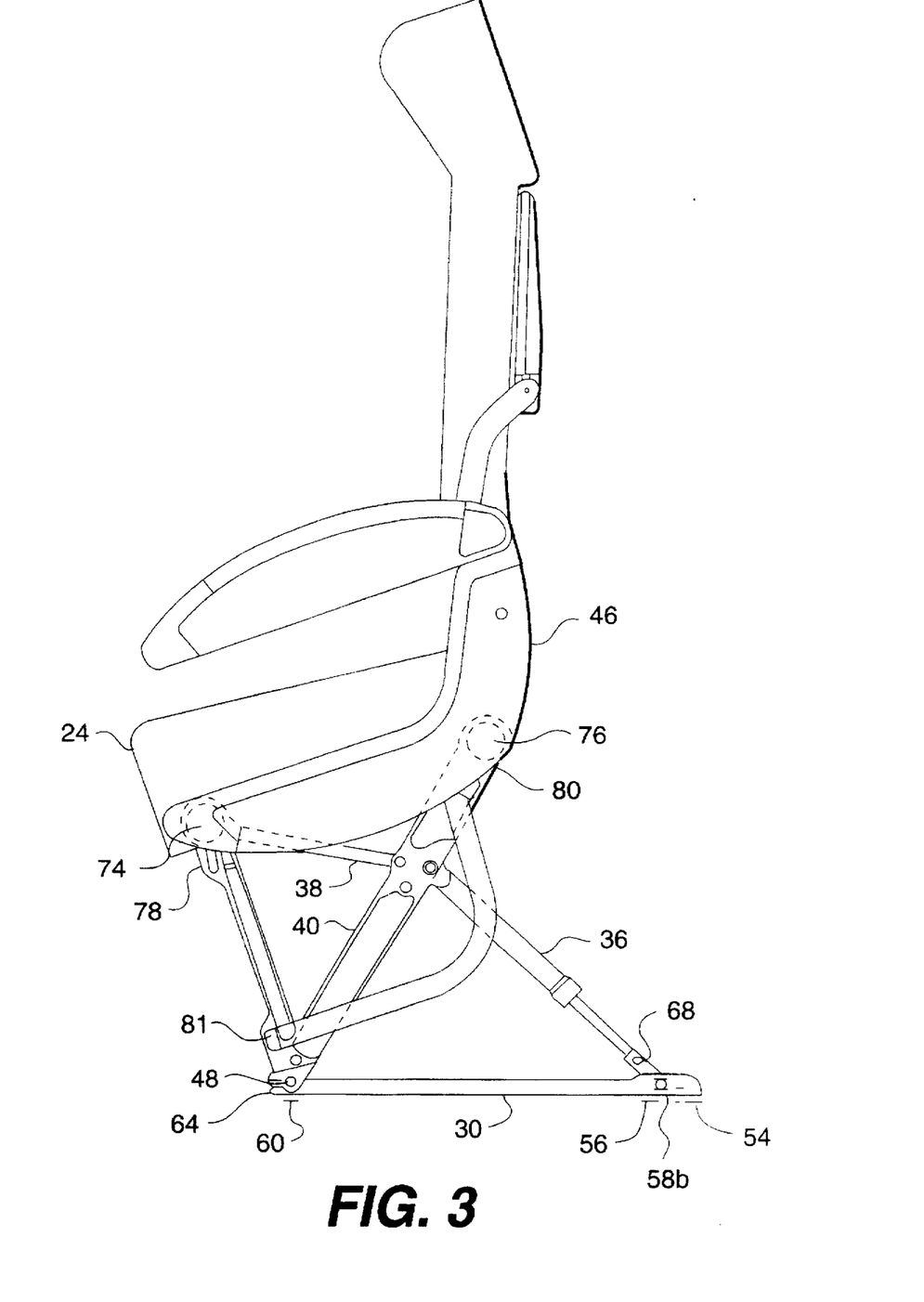
FIG. 3 is a schematic diagram of a side view of the seat as it is pitching forward during a crash.

The seats are held rigidly upright during normal use by two or more leg assemblies, as shown in FIG. 1. As shown in FIGS. 2 and 3, each leg assembly comprises a base member attached to the floor at the front end and at its rear end, and a V-leg whose vertex pivots about an axis passing through the front of the base members and whose upper ends attach to the stretcher beams supporting the seat pan. A load-limiting strut connects the rear end of the base member to an intermediate area along the diagonal member of the V-leg. A tension link connects the intermediate area on the diagonal member of the V-leg to the top of the vertical member of the V-leg.

When the forward load on the seat reaches a predetermined magnitude, the load-limiting strut elongates, permitting the V-leg and all components attached to it, including the passengers, to pitch forward while the load is applied, as shown in FIGS. 4, 5 and 5A–5D. The vertical reaction load between the base member and the floor is known precisely because the tension in the load-limiting strut is the only component applying vertical load to the rear end of the base member. The load at which the strut elongates is chosen to result in a load on the floor just below the magnitude that overstresses the floor and would result in the seat being torn out of the floor.

While the strut is elongating, it is absorbing energy which otherwise would be tearing the seat from the floor. The acceleration pulse specified by the FAA applies forward load to the seat for only a short period. Therefore, the forward pitching motion of the seat can be halted before all the available load-limiting stroke is consumed. For a 16 g pulse applied to a seat mounted on a floor intended to support the seat for only a 9 g acceleration, up to 8 inches of displacement of the occupant center of gravity is allowed before the pitching motion must be stopped.

After the crash, the occupants must leave their seats to exit the aircraft. Were the seat to remain pitched forward, a danger of entrapment of the occupants would exist, particularly in the case of unequal deformation of adjacent seats. The present invention accommodates this requirement by allowing its energy absorbing strut to retract to its precrash position. This allows the seat to pitch back to its precrash position. This is likely to occur as a rebound in the latter stages of the crash. The FAA Design Criteria Amendment Part 25-64 limits the post-crash displacement of the seat to 3 inches. If necessary, the passengers can push the seat back after the crash.

For severe crashes above and beyond the FAA design criteria, the built-in stop within the load-limiting strut engages to prevent the strut from coming apart.

The tension link connecting the intermediate area on the diagonal member of the V-leg to top of the vertical member of the V-leg carries some or all of the load that is introduced into the V-leg from the load-limiting strut. The most efficient structural condition exists when the link is required to stretch at a predetermined tension that is less than the load introduced by the load-limiting strut.

The shape of the tension link is selected to allow the tension link to stretch in a controlled manner. The tension link is basically a rectangular bar, with a channel machined into most of the length of the link. This reduces the cross-sectional area of the tension link, to enable that portion of the link to stretch. The machined channel stops short of the ends of the link, which are drilled for riveted connections to the diagonal, in order to avoid overstressing the ends.

The stretchable tension link produces more consistent loads within the seat structure, by making the tension link stretch at a load of approximately ⅔ of the stroking load of the load-limiting strut, and by reducing the bending strength of the diagonal portion of the V-leg. The tension link also causes the load to be shared more evenly between two lateral members, called stretchers, which stretch laterally across the front and rear of the seat pan. The stretchers are interconnected by substantially longitudinal structural members. For a typical three-passenger seat, four of the longitudinal structural members are present, defining the sides of each of the three seats. The lap belts, backrests, and armrests attach to, and impose their loads upon, the longitudinal members. The leg structural system conveys these loads to the load-limiting strut.

The passenger seats of the present invention have to be designed specifically for each model of aircraft or passenger vehicle. Some models may require the leg to be located in close proximity to the longitudinal members. Other models require the leg to be located as much as 10 inches away from the longitudinal members. When the leg is located in close proximity to the longitudinal members, much of the load tends to be transferred through the longitudinal member to the front stretcher then back through the tension link to the load-limiting strut. In this case, the leg behaves as a structurally efficient truss. When the leg is not located in close proximity to the longitudinal members, more bending and load redistribution occurs in the stretchers, causing more load to be conveyed to the top of the diagonal portion of the V-leg. Thus, in the latter case, the V-leg must act while bending, which is not as effective.

The rear floor attachment fittings are similar to those described in U.S. Pat. No. 4,911,381 with the exception of a lower profile which is desirable in presenting less of a chance of a passenger tripping on them or snagging carry-on luggage. The front attachment fitting uses an almost-spherical ball, shown in FIGS. 8 and 8A-8D, which helps accommodate floor warpage. The anti-rattler locking feet also serve as visual indicators of a locked-in-place condition.

Accordingly, it is an object of the present invention to provide a new and improved energy-absorbing leg assembly for passenger seats in aircraft and other passenger vehicles which reduces the chances for passenger injury resulting from seat failures in forward crashes.

Another object of the present invention is to provide a leg assembly in which floor reactions of a 16 g forward crash are limited to magnitudes that can be sustained by floors designed to withstand only 9 g loads.

A further object of the present invention is to provide a seat assembly which pitches forward in response to inertial loads in crashes that have reached a predetermined magnitude, but can be returned to roughly its pre-crash position so as not to hamper passenger egress.

A further object of the present invention is to provide an aircraft seat requiring reduced maintenance and minimal use of tools.

Another object of the present invention is to provide a seat assembly which can be easily adapted for use in different aircraft.

These and other objects of present invention are described in greater detail in the detailed description, the appended drawings, and the attached claims.

DETAILED DESCRIPTION OF THE INVENTION

FIG. 1 shows a seat assembly 20 which includes a typical upper seat portion and a leg assembly 22. Two or more identical leg assemblies 22 are used for each multi-passenger seat. As shown in FIG. 2, leg assembly 22 includes a base member 30, a V-leg 40, a load-limiting strut 36, and a tension link 38. Vertical member 40v of V-leg 40 is configured at the top end to clamp onto front stretcher 74, and the top of diagonal member 40d of the V-leg is configured to clamp onto rear stretcher 76 by means of clamps 78 and 80.

The stretchers are tubular members that run transversely to provide front and back supports for a flexible nylon bottom support which provides a base for a cushion 24. The nylon seat support is attached to the front and rear stretchers with hook-and-loop fasteners such as Velcro™, thus allowing adjustment without the use of tools. The diagonal member of the V-leg has holes in a central region, very roughly in the middle of the diagonal member, to provide bolt and nut connections for the load-limiting strut 36 and the tension link 38. Note that the central region does not have to be in the center of the diagonal V-leg—it just has to be substantially away from either end. The lower end of the load-limiting strut attaches to the rear end of base member 30 with bolt 58b and nut 58n, and provides a pivot point.

FIG. 3 shows seat assembly 20 pitching forward in response to a sudden deceleration. V-leg 40 pivots around pivot bolt 48 at the apex of V-leg 40, elongating load-limiting strut 36. Base member 30 is attached to the floor by front floor attachment stud 60 and rear floor attachment studs 54 and 56. FIG. 3 shows the most forward degree of pitching resulting from the maximum elongation of load-limiting strut 36. FIG. 3 shows that, when the seat pitches forward during a crash, the load-limiting strut is the only element causing vertical load to be applied to the rear attachment studs.

Figure 4:
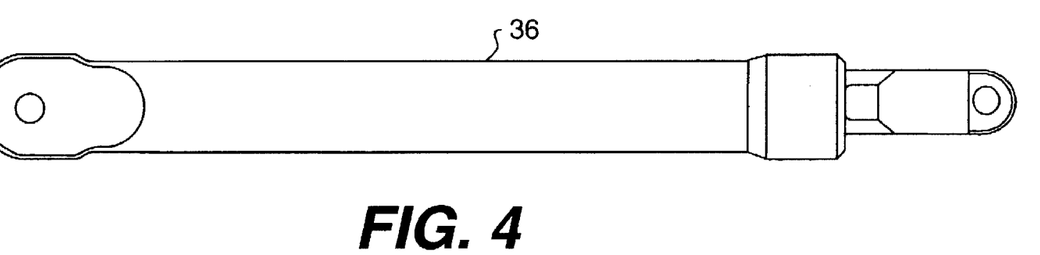
FIG. 4 is a schematic diagram of an outside view of the load-limiting strut.
Figure 5A:
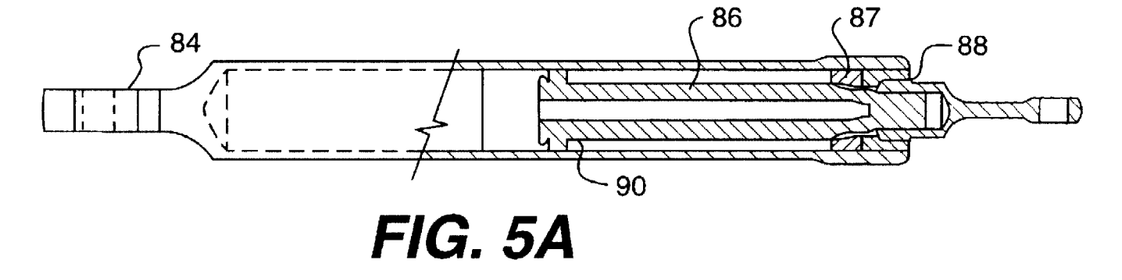
FIG. 5A is a schematic diagram of a cut-away view of the load-limiting strut of FIG. 4 in a precrash position.
Figure 5B:
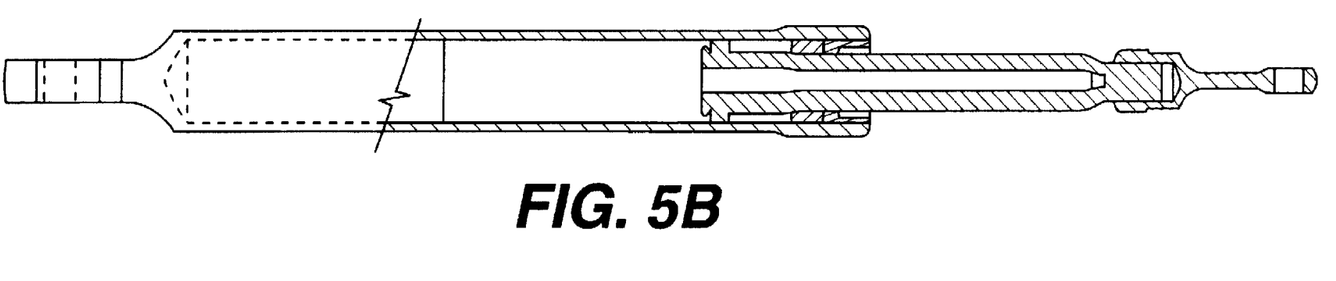
FIG. 5B is a schematic diagram of a cut-away view of the load-limiting strut while it is elongating during a crash.
Figure 5C:
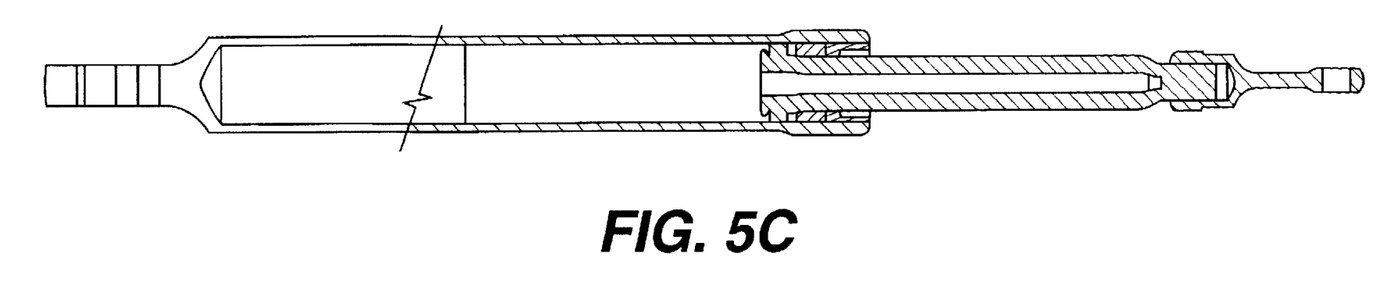
FIG. 5C is a schematic diagram of a cutaway view of the fully elongated load-limiting strut with rod flange in contact with the die.
Figure 5D:
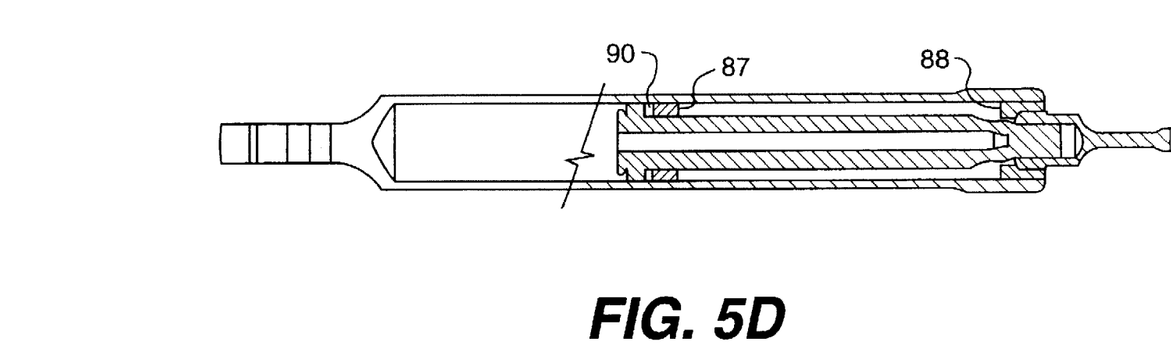
FIG. 5D is a schematic diagram of a cutaway view of the load-limiting strut after it has been returned to its normal length after a crash.

FIG. 4 is an outside view of load-limiting strut 36. FIGS. 5A–5C are cut-away views of load limiting strut 36 before a crash (FIG. 5A), as it is being elongated (FIG. 5B) and at its maximum elongation (FIG. 5C). FIG. 5D shows load-limiting strut after it has been returned to its pre-crash length, after a crash.

As the load-limiting strut is elongated during the crash, it absorbs energy by pulling tubular member 86 through die 87, resulting in the constriction of the tubular member 86 to a smaller diameter, as shown in FIGS. 5B and 5C. The desired limiting load of the load-limiting strut can be achieved by selecting the wall thickness of tubular member 86, its metallurgical properties, e.g., its strength and ductility, and by the difference between the diameters of tubular member 86 and the opening of die 87.

Tubular member 86 may be cylindrical with a uniform diameter, or it may be tapered to cause the deformation to vary as the elongation proceeds. Selection of a cylindrical or a tapered tubular member depends on whether the load must remain constant, or whether it should be variable to compensate for other changing conditions. The end 90 of tubular member 86 has an increased diameter, to prevent tubular element 86 from slipping completely through the die. This prevents load-limiting strut from coming completely apart.

Die 87 allows tubular member 86 to slide back into the strut housing during rebound. As explained above, this avoids permanent deformation of the seat, so that the seat does not interfere with passenger egress. Die 87 is a lightweight ring. It is supported by die holder 88. Die 87 slides back along with the end 90 of tubular member 86 into the strut housing during a rebound. Die holder 88 is a cone which supports die 87 during elongation, and disengages from die 87 during rebound.

Figures 6, 7:
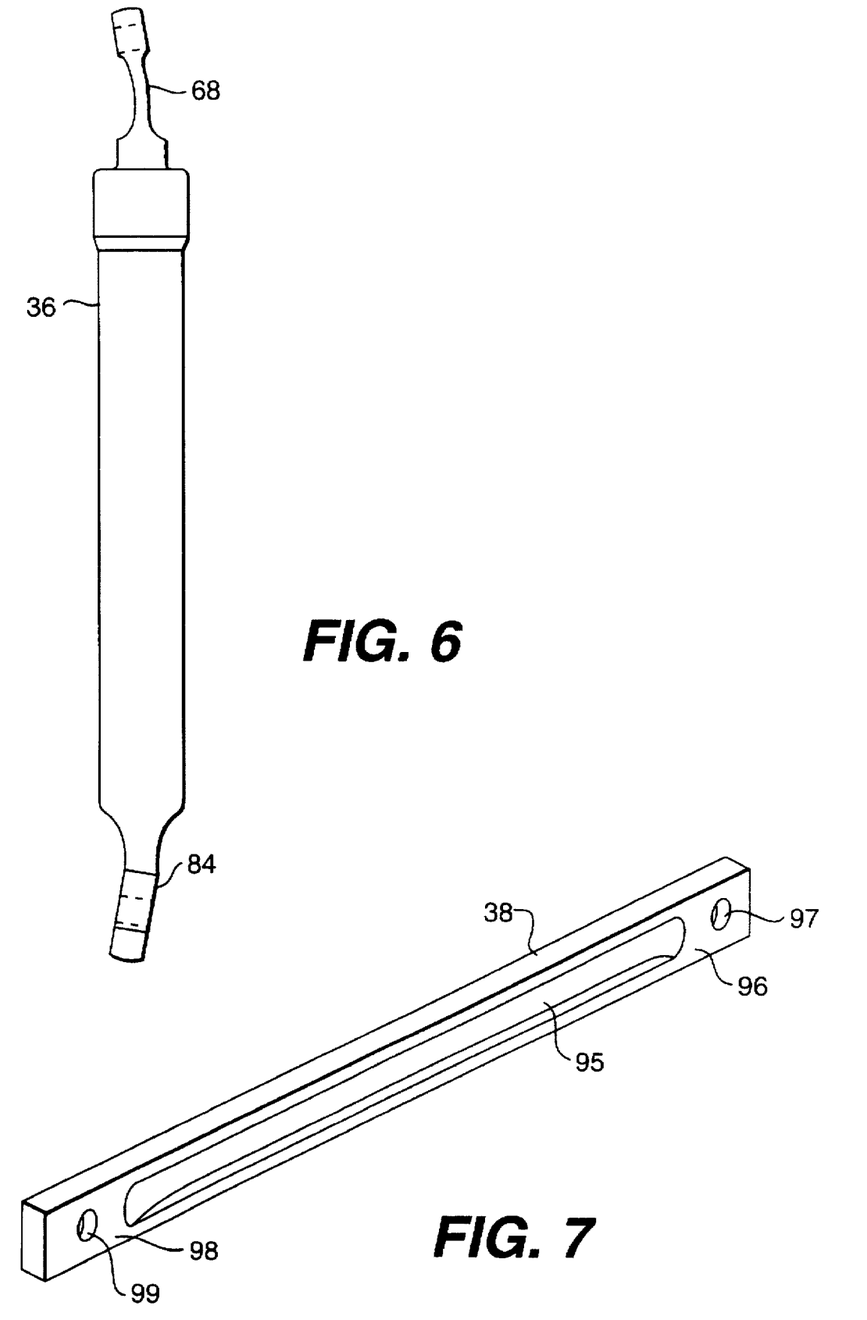
FIG. 6 is a schematic diagram of an outside view of the load-limiting strut showing where bending may occur to accommodate floor warpage.
FIG. 7 is a schematic diagram of a perspective view of the tension link.

As shown in FIG. 6, the ends 68 and 84 of load-limiting strut 36 are configured to bend and deform under loads from floor warpage. In addition, the open section portions of the V-leg 40 are made to twist if necessary to accommodate floor warpage.

Tension link 38 connects the central region or intermediate area of diagonal member 40d of V-leg 40 to the top of vertical member 40d. Tension link 38 stretches during the forward pitching motion. It makes the load on the seat structure more predictable. Tension link 38 stretches at a load approximately ⅔ of the stroking load of the load-limiting strut. By reducing the strength of the diagonal portion of the V-leg, more consistent loads and weight reduction are achieved.

The shape and cross-section of tension link 38 are selected to allow tension link 38 to stretch under an applied load. As shown in FIG. 7, channel 95 is machined into most of the length of tension link 38 to reduce its cross-sectional area and to allow it to stretch. The ends of tension link 38, ends 96 and 98, which contain holes 97 and 99 for bolt connections, are not channel shaped. This avoids overstressing a region already highly stressed by the presence of holes 97 and 99. The preferred material for tension link 38 is 2024-T3 wrought aluminum, which can be elongated by 18% or more before failure.

Figure 8:
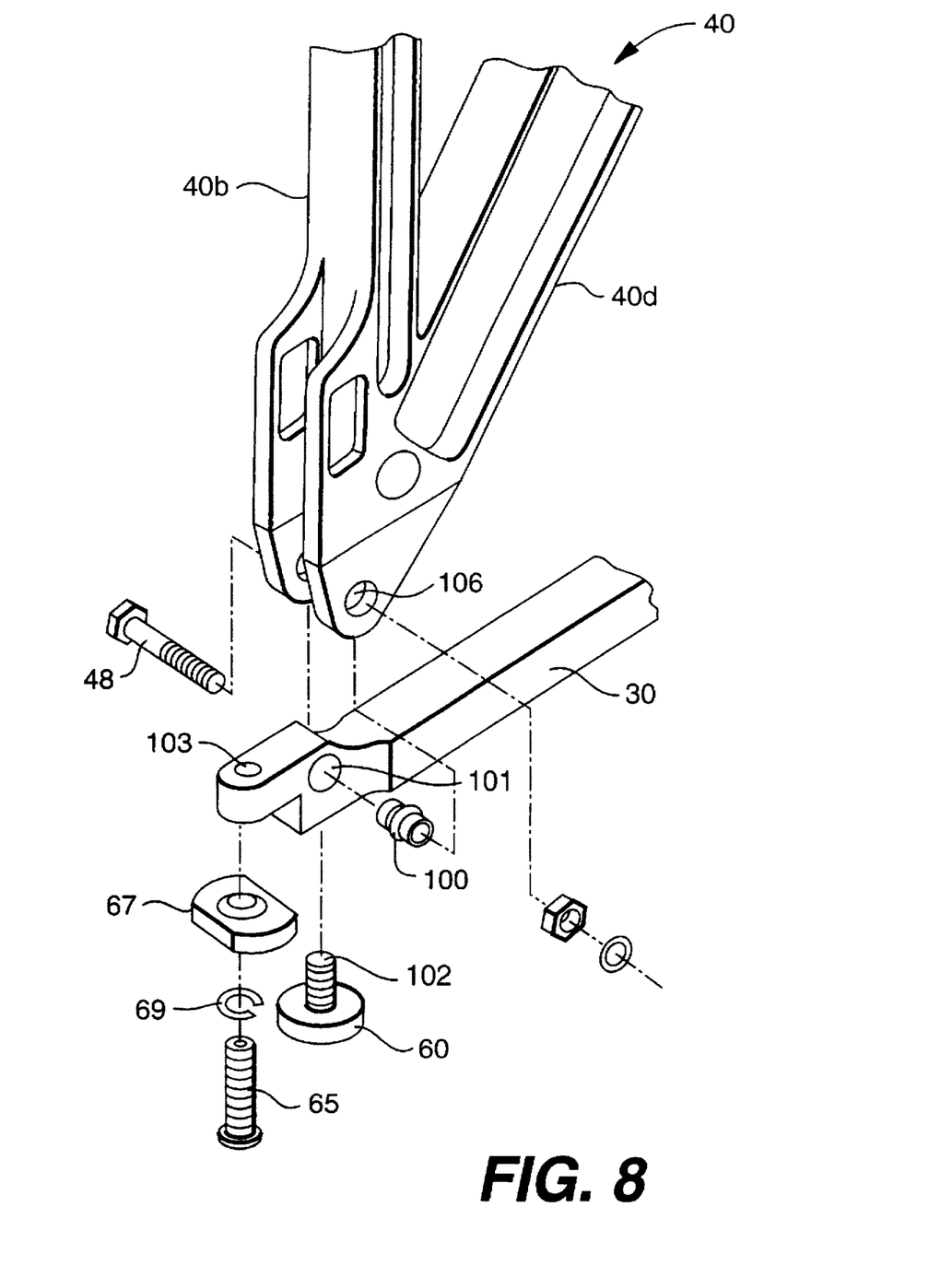
FIG. 8 is a schematic diagram of an exploded view of the front of the base member and the floor attachment fitting.
Figure 8A:
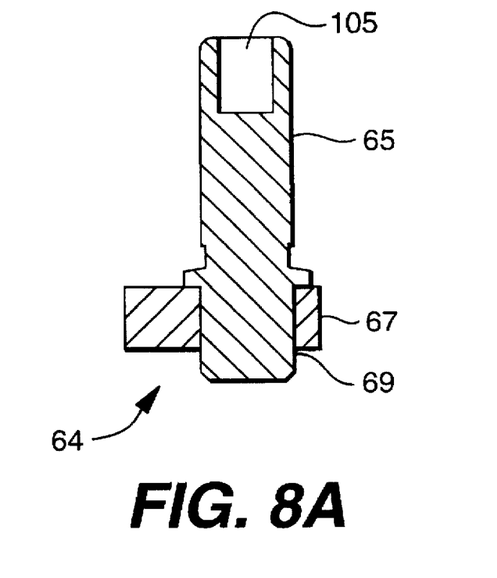
FIG. 8A is a schematic diagram of a section through the shear pin anti-rattler of FIG. 8.
Figure 8B:
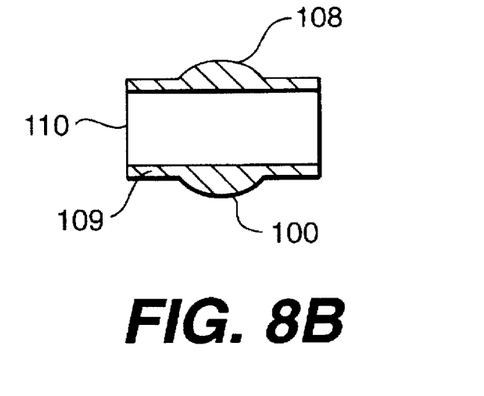
FIG. 8B is a schematic diagram of a section through the not quite spherical ball in FIG. 8.

FIG. 8 is an exploded view of the bottom front of the leg assembly. The apex of V-leg 40 is cut out to accept an almost spherical bearing 100. Hole 106 in the apex of V-leg 40 contains pivot bolt 48, to provide a pivot for a forward pitch during sudden deceleration. Almost spherical bearing 100 is a spherical ball with a flat band around its circumference. The position of bearing 100 before floor warpage is shown in the sectional view of FIG. 8C and its position after floor warpage in the sectional view of FIG. 8D.

Almost spherical bearing 100 holds base member 30 in the correct lateral location and correct roll attitude at its forward end. Almost spherical bearing 100 is located laterally by a cup 102 in the top of stud 60. Almost spherical bearing 100 is not perfectly spherical because it has a flat band 108 around its circumference. Flat circumferential band 108 around the otherwise spherical shape provides a close fit for almost spherical ball 100 within the bore 101 of base member 30. It is pressed by cup 102 upward against the inside cylindrical bore 101. This preloads circumferential band 108 against the top side of bore 101 to prevent angular misalignment during installation and removal of the seat from the aircraft. The load is spread by circumferential band 108 to avoid fretting of the mating surface of the base member bore. Rattling is also reduced. Pivot bolt 48 passes through bolt hole 110 in almost spherical bearing 100. Necks 109 stick out laterally from either side of almost spherical bearing 100, to support almost spherical bearing 100 around pivot bolt 48.

Figure 9:
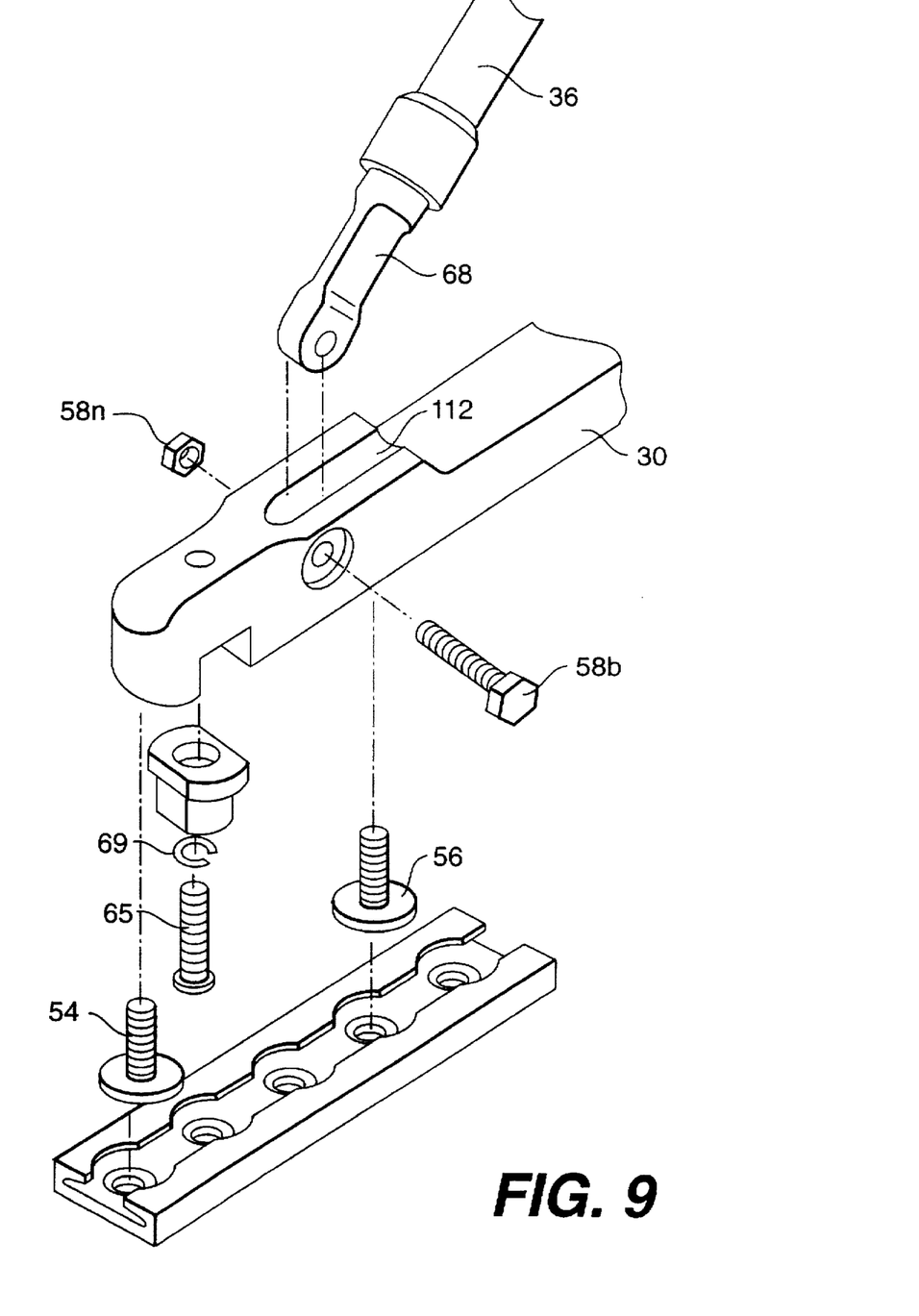
FIG. 9 is a schematic diagram of a perspective exploded view of the rear floor attachment assembly.
Figure 9A:
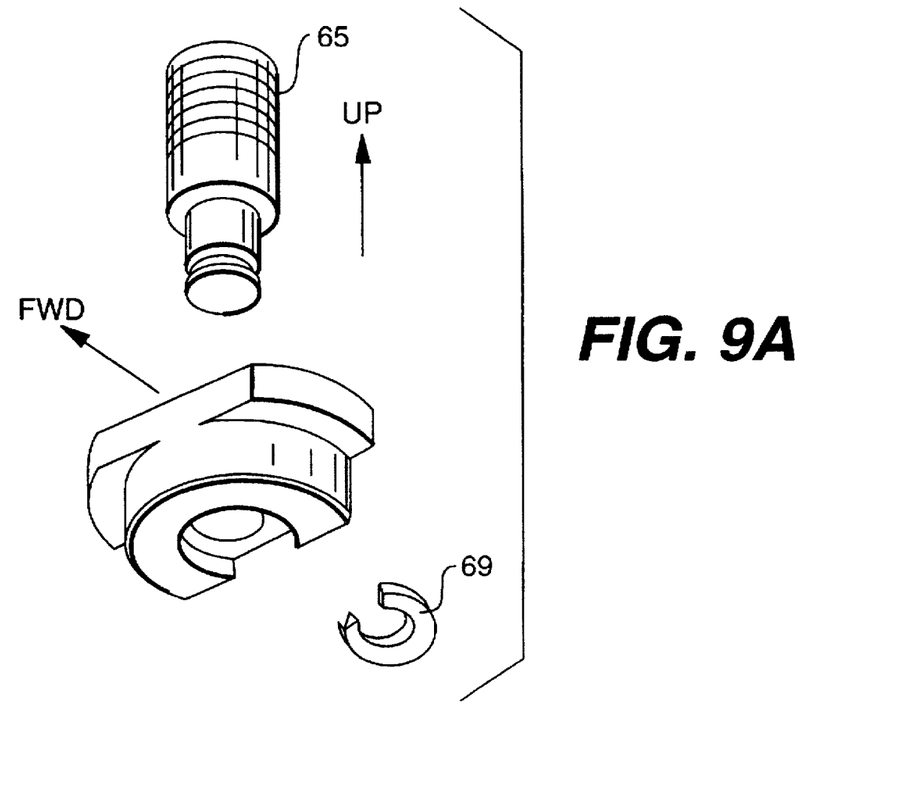
FIG. 9A is a schematic diagram of an exploded view of the rear shear pin with anti-rattler shoulder and adjustment screw of rear attachment fitting.

FIG. 9 shows base member 30. It is machined in one piece from a one inch square aluminum bar. Deformable end 68 of load-limiting strut 36 is inserted in a slot 112 cut into the top of base member 30, at the rear end of base member 30. Lateral fastener 58b attaches deformable end 68 to base member 30, and serves as a pivot. The low profile of base member 30 and the rounded edges at the rear end of the base member 30 are less likely to trip passengers or to snag carry-on luggage.

The low height above the floor of the fastener 58b attaching the load-limiting strut to the rear end of base member 30 is crucial. The fastener is located between the two rear studs 54 and 56, slightly closer to stud 56 (which is forward of stud 54), so that the line of action of the force transferred from load-limiting strut 36 to base member 30 is distributed evenly between the two rear studs 54 and 56. Due to the low position of the fastener 58b, the distribution of loads between the two rear studs 54 and 56 is not strongly affected by variations in loads and in directions of loads applied externally to the seat, or by variations in loads and in directions of loads resulting from changes in seat configuration that accompany the load-limiting stroke (forward pitching of the seat about the pivot at the front of the base member changes the orientation of the strut and the magnitude of compressive loads in the fore-aft direction carried within the base member). Rear studs 54 and 56 are spaced two inches apart to fit the spacing in the floor track. The two studs provide more resistance to vertical forces during sudden deceleration compared to a single stud.

Figures 8C, 8D, 10:
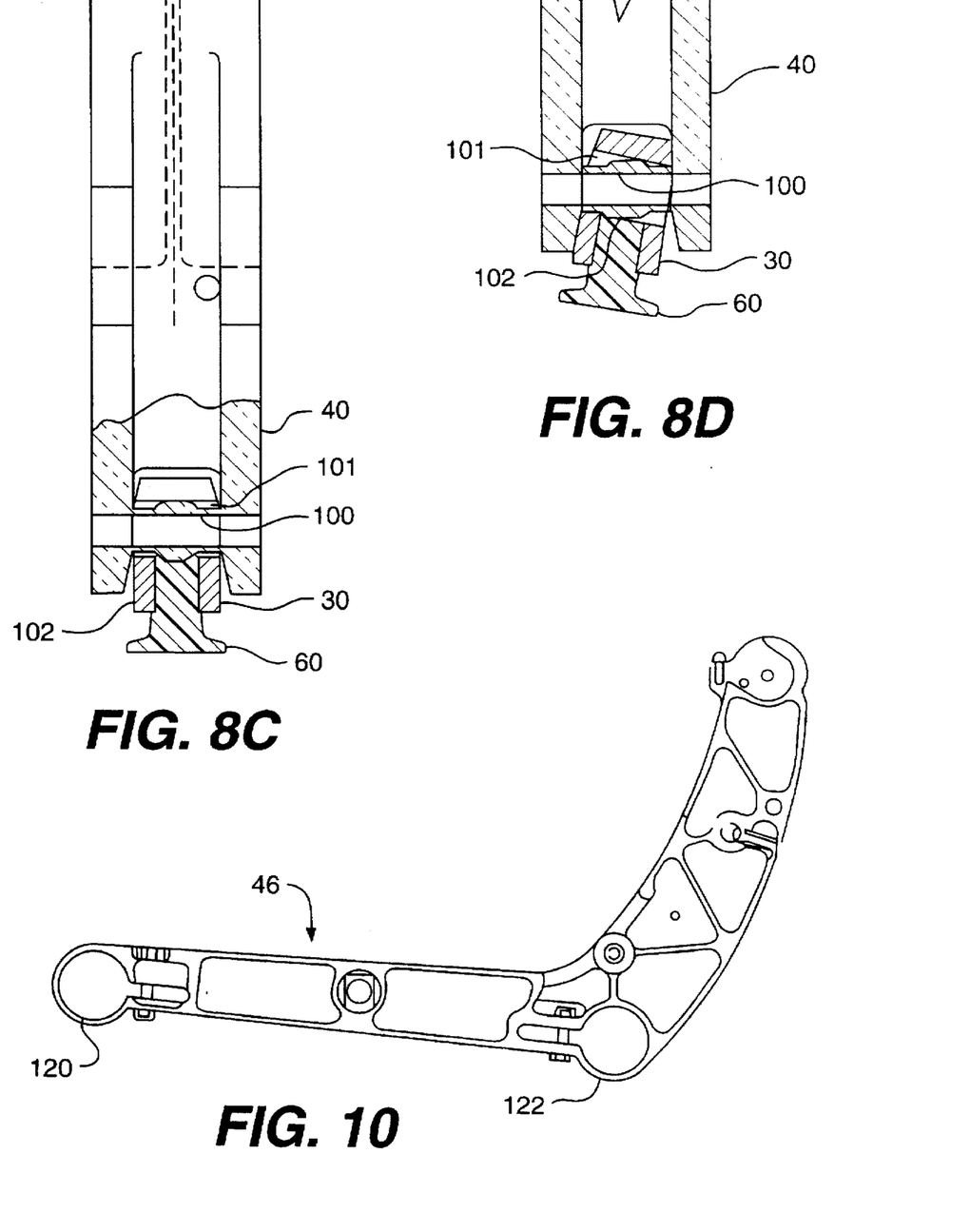
FIG. 8C is a schematic diagram of a section through the front fitting in FIG. 2.
FIG. 8D is a schematic diagram of the front floor attachment fitting after floor warpage has occurred.
FIG. 10 is a schematic diagram of a side view of the longitudinal member.

Forward attachment fitting has one mushroom stud 60, shown in FIGS. 8C and 8D. Front anti-rattler 64, comprised of attachment screw 65, foot 67, and C-clip 69, screws into hole 103 shown in FIG. 8. If head 105 of screw 65 protrudes above base member 30, that indicates an unlock position. At rear floor attachment fitting, shown in FIG. 9, an identical adjustment screw 65 also serves as a visual indicator of locking.

The seat is installed in a floor track by inserting mushroom-shaped front and rear studs 54, 56, and 60 into the circular openings in the track, moving the seat forward or backward ½ inch, and tightening the shear pin anti-rattlers using an Allen wrench. The heads of the mushroom-shaped studs are brought up snug to the overhanging T-shaped track. The visual indicators show that the seat has been fastened tightly in place. With the present invention, a vehicle's seat configuration can easily be re-arranged.

FIG. 10 is a side view of longitudinal member 46. Forward stretcher 74 and rear stretcher 76 (shown in FIGS. 2 and 3) are attached by clamps 120 and 122 to longitudinal members 46. The longitudinal members are located between each pair of seats, as well as on either side of the multi-seat assembly, i.e., there would be four longitudinal members in a three-seat assembly. The legs are located between seats, two legs for three seats, for example, as seen in FIG. 1.

The foregoing disclosure of a preferred embodiment of the invention has been presented for the purposes of illustration and description. It is not intended to be exhaustive or to limit the invention to the precise form disclosed. Many variations and modifications of the embodiments described herein will be obvious to one of ordinary skill in the art of the above information. The scope of the invention is to be defined only by the claims appended hereto.

What we claim is:

1. A seat for a passenger vehicle comprising:
    (a) a base member having a rear end and a forward end;
    (b) a V-leg having a vertex, a vertical member and a diagonal member, said vertical member extending vertically up from the vertex of the V-leg, and said diagonal member extending rearwards diagonally up from the vertex of the V-leg, wherein the diagonal member has a central region and a top end, and wherein the vertical member has a top end;
    (c) a load-limiting strut attached at its bottom end to rear end of the base member and attached at its top end to the central region of the diagonal member;
    (d) a tension link attached at its top end to the top end of the vertical member and at its bottom end to the central region of the diagonal member; and
    (e) a pivot bolt pivotally connecting the vertex of the V-leg to the forward end of the base member.

2. The seat of claim 1, wherein the load-limiting strut is an energy-absorbing strut which absorbs energy by elongating in the event of a forward crash.

3. The seat of claim 1, wherein the load-limiting strut comprises a tubular member and a die, and wherein the load-limiting strut is designed to absorb energy in the event that it is placed under a tensile load exceeding a predetermined value by pulling the tubular member through the die, constricting the tubular member to a smaller diameter.

4. The seat of claim 3, wherein the tubular member is cylindrical.

5. The seat of claim 4, wherein the tubular member comprises an end having an enlarged diameter, such that the end of the tubular member cannot be drawn through the die.

6. The seat of claim 3, wherein the tubular member is tapered.

7. The seat of claim 6, wherein the tubular member comprises an end having an enlarged diameter, such that the end of the tubular member cannot be drawn through the die.

8. The seat of claim 5 or claim 7, wherein the die includes means to allow the tubular member to slide back into load-limiting strut after the load-limiting strut is no longer under the tensile load.

9. The seat of claim 8, wherein the tension link is fabricated from aluminum.

10. The seat of claim 9, wherein the tension link is fabricated from wrought aluminum.

11. The seat of claim 9, wherein the tension link comprises a channel extending along a greater length of the tension link.

12. The seat of claim 1, wherein the dimensions of the tension link are selected such that the tension link stretches at a load equal approximately two-thirds of the limiting load of the load-limiting strut.

13. The seat of claim 1, wherein the seat comprises a seat pan having a front stretcher beam and a rear stretcher beam, and wherein the top end of the vertical member of the V-leg is attached to the front stretcher beam and the top end of the diagonal member of the V-leg is attached to the rear stretcher beam.

14. The seat of claim 1, wherein the ends of the load-limiting strut are configured to deform under loads from floor warpage.

15. The seat of claim 1, wherein the pivot bolt connects the base member to the vertex of the V-leg through an almost spherical bearing installed in the forward end of the base member, said almost spherical bearing being a spherical ball with a flat circumferential band.

16. A leg assembly for a passenger vehicle seat comprising:
    (a) a base member having a rear end and a forward end;
    (b) a V-leg having a vertex, a vertical member and a diagonal member, said vertical member extending vertically up from the vertex of the V-leg, and said diagonal member extending rearwards diagonally up from the vertex of the V-leg, wherein the diagonal member has a central region and a top end, and wherein the vertical member has a top end;
    (c) a load-limiting strut having a deformable top end and a deformable bottom end attached at its bottom end to the rear end of the base member by a lateral bolt and attached at its top end to the central region of the diagonal member;

(d) a tension link attached at its top end to the top end of the vertical member and at its bottom end to the central region of the diagonal member;

(e) a pivot bolt pivotally connecting the vertex of the V-leg to the forward end of the base member;

(f) two rear studs extending down from the rear end of the base member on either side of the lateral bolt; and (g) a front stud extending down from the front end of the base member below the pivot bolt.

17. The leg assembly of claim 16, wherein the heads of the front and rear studs are circular discs dimensioned to fit into vehicle floor tracks having an inverted T-slot cross-section.

18. The leg assembly of claim 16, wherein the load-limiting strut comprises a tubular member and a die, and wherein the load-limiting strut is designed to absorb energy if placed under a tensile load exceeding a predetermined value by pulling the tubular member through the die, constricting the tubular member to a smaller diameter.

19. The leg assembly of claim 18, wherein the tubular member comprises an end having an enlarged diameter, such that the end of the tubular member cannot be drawn through the die.

20. The leg assembly of claim 18, wherein the die is configured to allow the tubular member to slide back into the load-limiting strut after the load-limiting strut is no longer under the tensile load.

21. The leg assembly of claim 18, wherein the tension link is fabricated from aluminum.

22. The leg assembly of claim 21, wherein the tension link comprises a channel extending along the greater length of the tension link.

23. The leg assembly of claim 22, wherein the dimensions of the tension link are selected such that the tension link stretches at a load equal to approximately two-thirds of the limiting load of the load-limiting strut.

24. The leg assembly of claim 18, wherein the die is a lightweight ring, and wherein the load-limiting strut further comprises a cone-shaped die holder.

25. The leg assembly of claim 18, wherein the load-limiting strut is designed to retract back towards its original length, after it has been subjected to a tensile load and after it is no longer subjected to a tensile load, when a compressive load is applied to the load-limiting strut.

26. The leg assembly of claim 16, wherein the leg assembly is configured to reduce floor reaction to a forward load from a 16 g dynamic forward load to a 9 g static forward load.

27. The leg assembly of claim 26, wherein the load-limiting strut comprises a tubular member and a die, and wherein the load-limiting strut is designed to absorb energy if placed under a tensile load exceeding a predetermined value by pulling the tubular member through the die, constricting the tubular member to a smaller diameter.

28. The leg assembly of claim 27, wherein the tubular member comprises an end having an enlarged diameter, such that the end of the tubular member cannot be drawn through the die.

29. The leg assembly of claim 27, wherein the die is configured to allow the tubular member to slide back into the load-limiting strut after the load-limiting strut is no longer under the tensile load.

30. The leg assembly of claim 26, wherein the dimensions of the tension link are selected such that the tension link stretches at a load equal to approximately two-thirds of the limiting load of the load-limiting strut.

31. A seat assembly for a passenger vehicle comprising:
(a) a plurality of upper seat portions, comprising longitudinal members, a front stretcher, a rear stretcher and a seat pan, said seat pan being attached to the front stretcher at its front end and to the rear stretcher at its rear end;

(b) a plurality of base members, each base member having a rear end and a forward end, and each base member corresponding to one of the plurality of upper seat portions;

(c) a plurality of V-legs, each V-leg corresponding to one of the plurality of upper seat portions and having a vertex, a vertical member and a diagonal member, said vertical member extending vertically up from the vertex of the V-leg, and said diagonal member extending rearwards diagonally up from the vertex of the V-leg, wherein the diagonal member has a central region and a top end, wherein the vertical member has a top end, and wherein the top end of the diagonal member is attached to the rear stretcher and the top end of the vertical member is attached to the front stretcher;

(d) a plurality of load-limiting struts, each load-limiting strut corresponding to one of the plurality of upper seat portions, each load-limiting strut being attached at its bottom end to the rear end of the base member and attached at its top end to the central region of the diagonal member;

(e) a plurality of tension links, each tension link corresponding to one of the V-legs, each tension link being attached at its top end to the top end of the corresponding vertical member and at its bottom end to the central region of the corresponding diagonal member; and (f) a plurality of pivot bolts, wherein each pivot bolt pivotally connects the vertex of each V-leg to the forward end of the corresponding base member.

32. The seat assembly of claim 31, wherein each load-limiting strut comprises a tubular member and a die, and wherein the load-limiting strut is designed to absorb energy in the event that it is placed under a tensile load exceeding a predetermined value by pulling the tubular member through the die, constricting the tubular member to a smaller diameter.

33. The seat assembly of claim 32, wherein each tubular member comprises an end having an enlarged diameter, such that the end of the tubular member cannot be drawn through the die.

34. The seat assembly of claim 32, wherein the die is configured to allow the tubular member to slide back into the load-limiting strut after the load-limiting strut is no longer under the tensile load.

35. The seat assembly of claim 32, wherein the die is a lightweight ring, and wherein the load-limiting strut further comprises a cone-shaped die holder designed to support the die as the tubular member is drawn through the die.

36. The seat assembly of claim 31, wherein the tension link comprises a channel extending along a greater length of the tension link.

37. The seat assembly of claim 31, wherein the dimensions of the tension link are selected such that the tension link stretches at a load equal to approximately two-thirds of the limiting load of the load-limiting strut.

38. The seat assembly of claim 31, wherein the ends of the load-limiting struts are configured to deform under loads from floor warpage.

39. The seat assembly of claim 31, further comprising two mushroom-shaped rear studs extending downwardly from the rear end of each base member, and one mushroom-shaped stud extending downwardly from the front end of each base member.

40. The seat assembly of claim 31, wherein each pivot bolt connects the base member to the vertex of the V-leg corresponding to that base member through an almost spherical bearing installed in the forward end of the base member, said almost spherical bearing being a spherical ball with a flat circumferential band.

41. A leg assembly for a vehicle seat comprising:

(a) a base member having a rear end and a forward end;

(b) a V-leg having a vertex, a vertical member and a diagonal member, said vertical member extending vertically up from the vertex of the V-leg, and said diagonal member extending rearwards diagonally up from the vertex of the V-leg, wherein the diagonal member has a central region and a top end, and wherein the vertical member has a top end;

(c) a load-limiting strut attached at its bottom end to the rear end of the base member and attached at its top end to the central region of the diagonal member;

(d) a pivot bolt pivotally connecting the vertex of the V-leg to the forward end of the base member;

(e) two rear studs extending down from the rear end of the base member on either side of a lateral bolt; and (f) a front stud extending down from the front end of the base member below the pivot bolt, wherein the load-limiting strut provides the only vertical force applied to the rear studs as the leg assembly pivots forward around the pivot bolt.

42. The leg assembly of claim 41, wherein the load-limiting strut comprises a tubular member and a die, and wherein the load-limiting strut is designed to absorb energy if placed under a tensile load exceeding a predetermined value by pulling the tubular member through the die, constricting the tubular member to a smaller diameter.

43. The leg assembly of claim 42, wherein the tubular member comprises an end having an enlarged diameter, such that the end of the tubular member cannot be drawn through the die.

44. The leg assembly of claim 42, wherein the die is configured to allow the tubular member to slide back into the load-limiting strut after the load-limiting strut is no longer under the tensile load.

45. The leg assembly of claim 41, further comprising a tension link attached at its top end to the top end of the vertical member, and at its bottom end to the central region of the diagonal member.

46. The leg assembly of claim 45, wherein the tension link is fabricated from aluminum.

47. The leg assembly of claim 45, wherein the tension link comprises a channel extending along a greater length of the tension link.

48. The leg assembly of claim 45, wherein the dimensions of the tension link are selected such that the tension link stretches at a load equal to approximately two-thirds of the limiting load of the load-limiting strut.

49. The leg assembly of claim 41, wherein the load-limiting strut comprises a structural member and a die, and wherein the load-limiting strut is designed to absorb energy if placed under a tensile load exceeding a predetermined value by extruding the structural member through the die, reducing the outer dimension of the structural member.

50. The leg assembly of claim 41, wherein the load-limiting strut is designed to retract back towards its original length, after it has been subjected to a tensile load and after it is no longer subjected to a tensile load, when a compressive load is applied to the load-limiting strut.

51. The leg assembly of claim 41, wherein the leg assembly is configured to reduce floor reaction to a forward load from a 16 g dynamic forward load to a 9 g static forward load.

\* \* \* \* \*